(No Model.)
E. A. WILLIAMS.
SYRINGE.
No. 374,026. Patented Nov. 29, 1887.
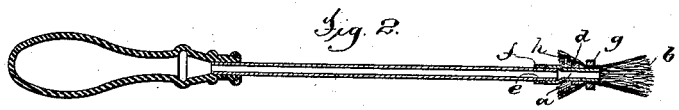
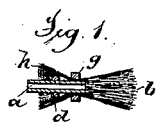
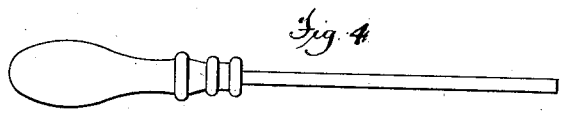
Attest:
Geo. H. Botts
T. M. Clarke
Inventor:
Edward A. Williams
By H. B. Titus
Atty

UNITED STATES PATENT OFFICE.

EDWARD A. WILLIAMS, OF BROOKLYN, NEW YORK.

SYRINGE.

SPECIFICATION forming part of Letters Patent No. 374,026, dated November 29, 1887.

Application filed February 17, 1887. Serial No. 227,901. (No model.)

*To all whom it may concern:*

Be it known that I, EDWARD A. WILLIAMS, of the city of Brooklyn and State of New York, have invented certain new and useful Improvements in Syringes, of which the following is a specification.

My invention combines the use in surgery of a syringe and brush, while avoiding objections to the use of either by itself.

In the drawings, Figures 1 and 3 are central longitudinal sectional views of interchangeable tips. Fig. 4 is a plan view of the bulb and stem. Fig. 2 is a central longitudinal sectional view of the device complete, with the tip, as shown in Fig. 1, attached.

To form the tips I attach by suitable means around one end of a short flexible elastic tube, $a$, made preferably of rubber, soft camel's hair, $b$, in the form of a brush, as shown in Fig. 3, and to another I attach camel's hair, so fastened at or near the center as to form a duplex or double-acting brush, as in Fig. 1. These tips are attached interchangeably to the syringe, as the use of either may be preferred, by inserting the nozzle in the free end of the tube, which by its elasticity and friction holds the tip in place.

The device, as shown in Fig. 2, is specially intended as an ear-syringe. When inserted in the ear, the fine soft ends of the hairs come in contact with the membrana tympani, and the liquid being injected through the tube $a$ centrally within the brush does not impinge in a stream upon this extremely delicate and sensitive membrane, but simply keeps the brush saturated from the interior by a continuous fresh supply of the liquid used, while the outer reverse brush, $h$, formed of the stiffer ends of the hairs, collects the wax and secretions of the ear and removes them when withdrawn. The proper form of the brush $h$ is obtained by the use of two elastic bands, $g$ and $d$, the former being placed around the brush at or near the point where the hairs are fastened to the tube, and the smaller band, $d$, around the tube underneath the hairs, and both, being movable, not only may the length of this reverse brush be varied at will, but the hairs may be set at any desired angle, according to the size and condition of the auditory passage.

The stem of this syringe may be provided with one or more small radial perforations or openings, $e$, and a sliding collar, $f$, which is moved at pleasure toward the bulb, so that the liquid injected may be partly discharged through the openings $e$ into the auditory passage outside the brush.

The device is also adapted for use as a nasal syringe, for the eye, for cleansing wounds and painting sores, and especially for the application of lotions composed partly of sulphuric ether or other volatile liquids which evaporate from the brush or sponge while being applied in the ordinary way. Besides, the operator is enabled to graduate at will the quantity applied and the lotion is not contaminated by the frequent dipping into it of the brush.

A very important feature of my invention, especially when used as a nasal or an ear syringe, is the flexibility of the tip to and at the point of junction with the stem, whereby all danger of abrasion or injury to the membrane is avoided, and the tip so adapts itself to the nasal or auditory passage as to prevent too great pressure at any point of contact.

Having thus described my invention and its uses, what I claim, and desire to secure by Letters Patent, is—

1. In a syringe, the combination of the bulb and stem with the flexible elastic tube $a$ and the brush $b$.

2. The combination of the bulb and stem with the flexible elastic tube $a$ and the duplex brush $b$ $h$, said brush being provided with an exterior movable elastic band, $g$, and a movable elastic band, $d$, passing around the tube $a$ underneath the hairs.

3. The combination of the bulb and stem, said stem being provided with radial openings $e$, and a sliding collar, $f$, said collar being adapted to close or leave free the openings $e$, with the duplex brush $b$ $h$, said brush being provided with an exterior movable elastic band, $g$, and a movable elastic band, $d$, passing around the tube $a$ underneath the hairs.

EDWARD A. WILLIAMS.

Witnesses:
H. B. TITUS,
F. S. WILLIAMS.